US011662238B2

(12) United States Patent
Schumacher (10) Patent No.: US 11,662,238 B2
(45) Date of Patent: May 30, 2023

(54) DEVICE FOR METERING A GRANULAR OR GRAINY MATERIAL IN A DISTRIBUTOR MACHINE AND DISTRIBUTER MACHINE

(71) Applicant: Kverneland AS, Klepp Stasjon (NO)

(72) Inventor: Ferdinand Schumacher, Lippetal-Oestinghausen (DE)

(73) Assignee: KVERNELAND GROUP SOEST GMBH, Soest (DE)

( * ) Notice: Subject to any disclaimer, the term of this patent is extended or adjusted under 35 U.S.C. 154(b) by 691 days.

(21) Appl. No.: 16/500,835

(22) PCT Filed: Mar. 26, 2018

(86) PCT No.: PCT/EP2018/057665
§ 371 (c)(1),
(2) Date: Jan. 3, 2020

(87) PCT Pub. No.: WO2018/184896
PCT Pub. Date: Oct. 11, 2018

(65) Prior Publication Data
US 2020/0217703 A1 Jul. 9, 2020

(30) Foreign Application Priority Data
Apr. 6, 2017 (EP) .................................. 17165282

(51) Int. Cl.
*G01F 3/24* (2006.01)
*A01C 7/06* (2006.01)
(Continued)

(52) U.S. Cl.
CPC .................. *G01F 3/24* (2013.01); *A01C 7/06* (2013.01); *A01C 7/102* (2013.01); *A01C 7/125* (2013.01); *G01F 11/024* (2013.01)

(58) Field of Classification Search
CPC . G01F 3/24; G01F 11/024; A01C 7/06; A01C 7/102; A01C 7/125
(Continued)

(56) References Cited

U.S. PATENT DOCUMENTS 3,656,661 A * 4/1972 Schumacher .......... A01C 7/102
406/135
3,680,742 A * 8/1972 Patterson ............... A01C 7/125
222/367
(Continued)

FOREIGN PATENT DOCUMENTS

DE 10 2007 034 997 A1 1/2009
WO WO-2008150239 A1 * 12/2008 ............. A01C 7/084
WO WO-2014183182 A1 * 11/2014 ............. A01C 19/02

*Primary Examiner* — Paul R Durand
*Assistant Examiner* — Michael J. Melaragno
(74) *Attorney, Agent, or Firm* — Leason Ellis LLP (57) ABSTRACT

The invention relates to a device for metering a granular or grainy material in a distributor machine, comprising a housing; an inlet opening which is formed on the housing and through which a granular or grainy material can be introduced in the housing for metering; an outlet opening which is formed on the housing and through which the granular or grainy material can be discharged out of the housing after metering; a metering space which is formed in the housing in such a way that granular or grainy material in the housing can be moved from the inlet opening via the metering space to the outlet opening; a metering wheel which is arranged in the metering space on a drive shaft, and which is configured to meter the granular or grainy material supplied via the inlet opening; a mounting opening which is formed on the housing and via which the metering wheel can be exchangeably mounted in the metering space; and a mounting component which is detachably arranged in the mounting opening in a mounted position, and this in turn is arranged at least partially welded onto the housing, wherein the mounting component has a receiving unit for detachably receiving the metering wheel, in such a way that the metering wheel received on the receiving unit is mounted on the drive shaft when arranging the mounting component in the mounted position, and in such a way that, when detaching the
(Continued)

mounting component from the mounted position, the metering wheel is forcibly detached from the drive shaft (6), such that the metering wheel can be removed from the metering space in this way and can be detached from the housing together with the mounting component. A distributor machine is also provided for distributing a granular or grainy material, such as seeds, fertiliser or grit.

14 Claims, 5 Drawing Sheets

(51) Int. Cl.
*A01C 7/10* (2006.01)
*A01C 7/12* (2006.01)
*G01F 11/02* (2006.01)

(58) Field of Classification Search
USPC .......................................................... 222/71
See application file for complete search history.

(56) References Cited

U.S. PATENT DOCUMENTS

| | | | |
|---|---|---|---|
| 5,845,818 A | 12/1998 | Gregor et al. | |
| 6,285,938 B1* | 9/2001 | Lang | A01M 7/0089 239/10 |
| 9,801,330 B2* | 10/2017 | Bent | A01C 7/046 |
| 9,844,174 B2* | 12/2017 | Gervais | A01C 19/02 |
| 9,909,914 B2* | 3/2018 | Kowalchuk | G01F 11/003 |
| 9,939,302 B2* | 4/2018 | Gervais | G01F 11/24 |
| 10,390,479 B2* | 8/2019 | Cloutier Boily | A01C 5/062 |
| 2009/0293648 A1* | 12/2009 | Pottmann | G01F 11/40 73/864.34 |
| 2010/0307395 A1* | 12/2010 | Snipes | A01C 7/102 111/11 |
| 2012/0211508 A1* | 8/2012 | Barsi | A01C 7/088 221/13 |
| 2014/0014012 A1* | 1/2014 | Schumacher | A01C 7/105 348/135 |
| 2014/0076217 A1* | 3/2014 | Liu | A01C 7/206 111/174 |
| 2014/0261810 A1* | 9/2014 | Bent | A01C 7/082 137/625.11 |
| 2016/0120108 A1 | 5/2016 | Gervais et al. | |
| 2016/0120110 A1* | 5/2016 | Gervais | A01C 7/127 403/321 |
| 2016/0120111 A1* | 5/2016 | Gervais | G01F 11/003 222/333 |
| 2017/0118905 A1* | 5/2017 | Bent | A01C 7/12 |
| 2017/0318740 A1* | 11/2017 | Heathcote | A01C 7/046 |
| 2018/0263176 A1* | 9/2018 | Cloutier Boily | A01C 7/124 |
| 2018/0263178 A1* | 9/2018 | Cloutier Boily | A01C 5/062 |
| 2020/0217703 A1* | 7/2020 | Schumacher | G01F 11/024 |

\* cited by examiner

DEVICE FOR METERING A GRANULAR OR GRAINY MATERIAL IN A DISTRIBUTOR MACHINE AND DISTRIBUTER MACHINE

CROSS REFERENCE TO RELATED APPLICATIONS

The application is a national stage of International Application No. PCT/EP2018/057665, filed on Mar. 26, 2018, which claims priority to European Patent Application No. 17165282.9 filed on Apr. 6, 2017, titled "Device For Metering A Granular Or Grainy Material In A Distributor Machine And Distributer Machine" the contents of each of which are herein incorporated by reference in their entireties.

The invention relates to a device for metering a granular or grainy material in a distributor machine, and to a distributor machine, in particular a seed drill, fertiliser spreader, spreading machine or spreading tool.

BACKGROUND

Distributor machines serve in various applications for discharging a granular or grainy material. They in particular include distributor machines in the agricultural sector, such as seed drills or fertiliser spreaders. Distributor machines or devices also are used by municipal or regional administrations to discharge various granular or grainy materials such as seeds, fertiliser, or other grit.

In distributor machines, the granular or grainy material typically is received in a tank or a storage container (reservoir). From the storage container, the material goes through a metering device to reach the distributing device, by means of which the metered material finally is discharged and distributed, for example onto agricultural land or a public area managed by a municipal or regional administration. The granular or grainy material is metered for the respective application by means of the metering device, up to the granular or grainy material being dispersed individually.

Metering devices are known in which the granular or grainy material to be metered reaches a metering space via an inlet opening formed on a housing of the metering device. A metering wheel is mounted on a drive shaft in the metering space, which shaft is rotated by means of a drive device during its operation, in particular rotated by means of an electric motor. The material is metered by means of the metering wheel and then passes through an outlet opening on the housing to reach the distributing device, by means of which the metered material is discharged and distributed.

The document US 2016/120108 A1 discloses an agricultural metering system with a modular metering wheel cartridge. The modular metering wheel cartridge contains a metering wheel. The modular metering wheel cartridge furthermore has a housing which rotatably supports the metering wheel. The housing is configured such that it selectively engages with a metering cell of the agricultural metering system in order to position the metering wheel within the metering cell while the housing is engaged with the metering cell, and that it is selectively released from the metering cell.

The document DE 10 2007 034 997 A1 discloses an agricultural distributing device for the metered distribution of grainy material such as seeds or fertiliser of various sizes and types using at least one metering tool having one or a plurality of interchangeable cell wheels, which are arranged in a housing and which direct the material issued from a cell wheel toward at least one distributing device, wherein a drive shaft is rotatably supported in the housing, the cell wheel is arranged on said drive shaft, the housing has at least one lateral opening for extracting and replacing the interchangeable cell wheels, and the lateral opening can be covered by a base plate detachably arranged on the housing. To ensure a quick and simple exchange of the cell wheel under difficult replacement conditions, it is provided that the cell wheel has an annular edge with a circumferential annular groove and that the support element has hook-like edges on its side facing the cell wheel or the housing, which edges catch the annular groove and/or interact with the annular groove and/or the annular edge.

The document U.S. Pat. No. 5,845,818 A discloses a metering system which is driven by a gear to meter bulk materials out of a tank. The metering system has a metering housing, inside which a metering cartridge having an inlet is mounted, said inlet being connected detachably with the tank. A metering wheel having an axial borehole is rotatably supported in the metering cartridge. A shaft extends through the axial borehole of the metering wheel such that the metering wheel rotates along with the drive shaft. A drive is fixed to one end of the drive shaft such that it cannot rotate relative to the drive shaft. The metering cartridge has an engaged position, in which the metering cartridge is fixed within the metering housing and the drive engages via the gear to rotate the metering wheel, as well as a released position, in which the drive does not engage via the gear, such that the metering cartridge can be removed from the metering housing and the inlet of the housing component is at least partially decoupled from the tank.

SUMMARY

The problem underlying the invention is to specify a device for metering a granular or grainy material in a distributor machine, and a distributor machine, which improve ease of use and minimise maintenance costs.

The problem is solved by a device for metering a granular or grainy material in a distributor machine according to independent claim 1. Other alternative designs are the subject of dependent claims.

According to one aspect, a device is created for metering a granular or grainy material in a distributor machine or distributing tool. The device has a housing with an inlet opening and an outlet opening. Granular or grainy material can be introduced in the housing via the inlet opening for metering. After it has been metered, the granular or grainy material can be discharged from the housing via the outlet opening. A metering space is arranged in the housing in such a manner that the granular or grainy material can pass from the inlet opening via the metering space to the outlet opening in the housing. A metering wheel is arranged on a drive shaft in the metering space, which wheel is set up to meter the granular or grainy material supplied via the inlet opening. The housing has a mounting opening, through which the metering wheel can be mounted exchangeably or detachably in the metering space. The device has a mounting component which is detachably arranged in the mounting opening in a mounted position on the housing such that said component at least partially covers said opening. The mounting component has a receiving unit to detachably or exchangeably receive the metering wheel in such a manner that the metering wheel received in the receiving unit is mounted on the drive shaft when the mounting component is arranged in the mounted position and that the metering wheel is forcibly detached from the drive shaft when the mounting component is released from the mounted position, such that the metering wheel is thereby removable from the metering space and is detachable from the housing together with the mounting component.

According to another aspect, a distributor machine or a distributing tool having a device for metering is created for distributing a granular or grainy material, such as seeds, fertiliser, or grit. The distributor machine or the distributing tool can, for example, be a seed drill, a fertiliser spreader, or a spreading machine or spreading tool for discharging and distributing a granular or grainy material.

The metering wheel received in the receiving unit can be mounted on the drive shaft in an operational position for metering when the mounting component is arranged in the mounted position. The assembly in the operational position for metering can be performed automatically or forcibly when the mounting component is brought into the mounted position. In the operational position for metering, the metering wheel is set up to execute rotational or turning movements along with the drive shaft while in operation, while the shaft in turn is driven by means of a drive device, for example an electric motor. Herein, it is ensured that the metering wheel can be rotated smoothly and that the material reaching the metering space via the inlet opening is metered, up to the granular or grainy material being dispersed individually. In this or in other embodiments, the metering wheel in its operational position for metering can be received in the receiving unit of the mounting component, that is, is not released from the receiving unit after the mounting component is arranged in the mounted position and, optionally, also is not released from the mounting component.

The metering wheel received in the receiving unit can be rotatable, at least when the mounting component is arranged in the mounted position. The metering wheel is arranged in the receiving unit and is rotatable, at least when the mounting component is arranged in the mounted position. Herein, it can be provided in one embodiment, that the rotatability of the metering wheel in the receiving unit is only enabled when the mounting component is arranged in the mounted position, for example because a turning lock for the metering wheel in the receiving unit is unlocked via the arrangement of the mounting component in the mounted position, for example because a stop component of the receiving unit pushes against an associated stop in the metering space, thereby unlocking the turning lock.

The receiving unit can have a rotatable support component, in which the metering wheel is received detachably. The mounting component can be designed in multiple components or multiple pieces, for example with a housing cover, which is set up to completely or partially cover the mounting opening when the mounting component is arranged in the mounted position. The receiving unit can be arranged on the interior side of the housing cover, optionally along with the rotatable support component. During the operation of the metering device, the metering wheel and the rotatable support component can both rotate together, driven by means of the drive device of the drive shaft. Alternatively, the metering wheel can be arranged on a non-rotatable support component on the receiving unit and can rotate on the same during metering operations. The rotatable or non-rotatable support component of the receiving unit can be arranged on the mounting component in a detachable or non-detachable manner. Mounting the support component detachably can make it possible to exchange the metering wheel along with the support component.

The metering wheel can be arranged on the face of the mounting component by means of the receiving unit. In this or in other embodiments, the metering wheel can be received detachably on one or a plurality of protrusions on the mounting component. In case of an arrangement on the face of the mounting component, protrusions can be provided on the face of the same, or optionally on the support device, for example one or more protruding pins, onto which the metering wheel can be attached such that the one or more protruding pins reach through associated openings on the metering wheel. In its attached position, the metering wheel can be secured on the receiving unit of the mounting component in this or in other embodiments, for example in such a manner that a mechanical resistance has to be overcome to release the metering wheel from the receiving unit, such that an unintended separation of the metering wheel from the receiving unit is prevented.

The mounting component can be mountable in the mounting opening on the housing without the need for tools. Thus, in an embodiment, the metering wheel can be mounted and exchanged without tools, which supports a simple mounting process.

The mounting component can be screwed into an associated thread on the housing in the mounted position. For this purpose, associated threads on the mounting component on the one hand and the housing on the other can interlock. A pitch of the screw thread can be customized to correspond to the gradation of the thickness of various metering wheels. Herein, it can be provided that an advance of the mounting component in an axial direction for a complete or a half rotation (rotation by 180 degrees or 360 degrees) corresponds to the thickness gradation of metering wheels. The axial advance herein corresponds to the difference in thickness between two metering wheels. Thus, the operator can always place the mounting component in a defined position, which ensures a proper operation of the newly inserted metering wheel, in particular with regards to a smooth rotatability of the metering wheel. This prevents the mounting component from being screwed into the thread on the housing to an excessive extent or not far enough, either of which could cause problems during the operation of the metering wheel, in particular with regards to the metering wheel having too much or too little play to fulfil its metering function.

Mounting marks associated with each other can be provided on the mounting component and the housing, which marks determine the defined rotational positions of the mounting component relative to the housing. The mounting marks can mark an end position of the rotation, in which the mounting component is screwed in as far as possible, and a working position set back from the end position, to which the mounting component is rotated back while inserting the mounting component in the mounted position, such that a smooth rotational movement of the metering wheel is ensured. For example, the mounting marks can comprise a mounting mark on the mounting component and two mounting marks on the housing, wherein the mounting marks on the housing indicate the end position of the rotation and the working or operational position which is set back from the former. When mounting the mounting component, it is first rotated into the end position and then rotated back into the operational position, such that the respective marks lie opposite from each other.

The embodiments described previously in the context of the screw mounting of the mounting component can alternatively also be provided if the mounting component is mounted to the housing in another manner, for example via a plug connection, in which the mounting component is not screwed in, but is plugged in via a translational movement.

A lever mechanism can be provided here to first bring the mounting component into its end position and to then reverse it slightly into its operational position by means of the lever mechanism, which once again ensures the smooth rotatability of the metering wheel. Locking plug positions can correspond to the gradation of the thickness of various metering wheels.

A slider device can be provided, by means of which a material path for the granular or grainy material can be closed and opened between the inlet opening and the outlet opening within the housing, in particular between the inlet opening and the metering space. The slider device can be a manually operable slider device. It can be provided that the slider device comprises a plurality of slider devices, such that the material path can be completely opened, partially opened and completely closed.

The outlet opening can be a multiple path opening with separate exits, which can be closed and opened individually and/or jointly by means of a closing device. The closing device can have a manually operable closing device, for example a lever mechanism. For example, a first outlet opening and a second outlet opening can be provided by means of the multiple path opening, wherein the first outlet opening can be connected to a distributing device for discharging the metered material and the second outlet opening can be designed such that it remains clear, such that, for example, an evacuation of the metering space can be realised via the second outlet opening, in particular if the slider device has been closed previously. Furthermore the second outlet opening can be used for test or calibration operations, to capture metered volumes at the second outlet opening, for example in a bag, which are reviewed for adjustment or test purposes before the closing device is then switched over to discharge the metered material to the distributing device via the first outlet opening during regular operation. An evacuation opening can be provided to evacuate the metering space in particular. The evacuation opening can be provided in addition to the single path or multiple path outlet opening.

A deflecting device having a deflecting surface can be arranged on the housing, which device is associated with the outlet opening and/or the evacuation opening, and which is set up to deflect material exiting from the outlet opening and/or the evacuation opening. The deflecting surface can be arranged adjacent to one or more outlet openings and/or the evacuation opening to deflect or redirect material exiting from said openings, for example to redirect material exiting from the second outlet opening into the receiving bag.

A changeover box can be arranged on the housing, said box being designed to receive a plurality of interchangeable metering wheels. The changeover box can be formed as an open or closed box on the housing. The changeover box can be received detachably on the housing. A plurality of interchangeable metering wheels can be arranged in the changeover box, such that they are available to be mounted in the metering space. The interchangeable metering wheels in particular can differ in that they have graduated thicknesses. Alternatively or additionally, the receiving pockets can be designed in varying shapes and sizes on the circumferential surface of the metering wheels to realise different metering outcomes when the respective metering wheel is mounted on the drive shaft in the metering space.

The deflecting surface can be arranged on the changeover box. A surface of the changeover box serves as a deflecting surface for the metered material exiting from the outlet opening and/or the evacuation opening. It can be provided in this or in other embodiments that the changeover box can be arranged in various positions relative to the housing, for example by swiveling the changeover box about a swivel axis on the housing. The changeover box can be lockable in the various positions. The various positions can comprise a first position, in which the changeover box does not serve as a deflecting device, as well as a second position, in which the deflecting surface is provided by means of the changeover box.

The inlet opening can couple a material reservoir for the granular or grainy material. The material reservoir, which also can be referred to as a tank or a storage container, can be designed as a plastic container. The material reservoir can be arranged above the housing.

The outlet opening and/or the evacuation opening can be designed in a lowest point of the metering space on the housing, which supports a complete evacuation.

The drive shaft can extend transversely to the direction of the material path between inlet opening and outlet opening. For example, the material path between inlet opening and outlet opening can be oriented vertically across the metering space, such that the drive shaft extends horizontally.

The mounting opening can be designed as a lateral housing opening on the housing.

The alternatives described above can be provided appropriately in relation to the distributor machine or the distributing tool for distributing a granular or grainy material.

The device for metering can be a supplementary metering device in the distributor machine or the distributing tool, which device serves to additionally meter granular or grainy material. In this embodiment, the distributor machine has a main metering device and an auxiliary metering device (supplementary metering device), wherein the latter corresponds to the device for metering described above. For example, a main metering device can be provided for the seeds in a sowing unit. The auxiliary or supplementary metering device can serve to distribute or discharge the granular or grainy material as a supplement to the seeds, for example in the form of a special fertiliser. The auxiliary metering device can be designed as a micro-metering device, which in particular can cause the sowing unit to have a tank for the granular or grainy material of the auxiliary metering device that is smaller than a tank for the main metering device for the seeds, which is formed separately from the former.

DESCRIPTION OF EXEMPLARY EMBODIMENTS

In the following, further exemplary embodiments are explained in reference to figures of a drawing. The figures show.

FIGS. 1 to 4 respectively show schematic representations of a device for metering a granular or grainy material for a distributor machine or a distributing tool, wherein a perspective view, a sectional view and views from the front and from the side are shown in each instance.

Figure 1:
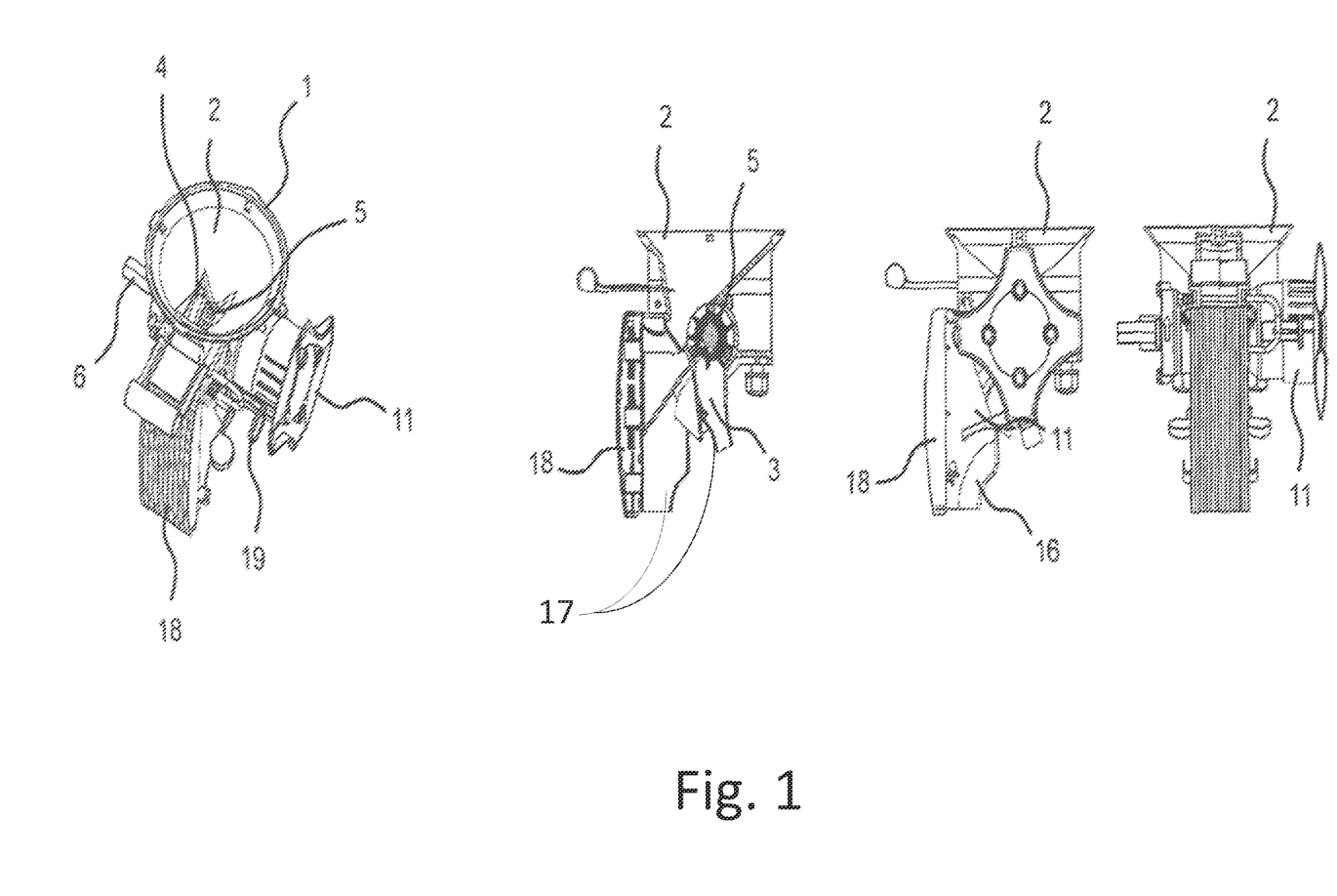
FIG. 1 schematic representations of a device for metering a granular or grainy material for a distributor machine.

The device for metering has a housing 1, on which an inlet opening 2 and an outlet opening 3 are formed, such that a granular or grainy material to be metered can pass from the inlet opening 2 via the metering space 4 to the outlet opening 3. A material reservoir (tank) holding the material to be metered couples to the inlet opening 2 when the device is installed in a distributor machine, an example of which is shown below in FIG. 5 for a sowing unit. The metered material moves from the outlet opening 3 to a distributing device, for example via a flexible hose connection. The granular or grainy material, such as fertiliser, seeds, or other grit, then is discharged by means of the distributing device.

A metering wheel 5 is arranged on a drive shaft 6 in the metering space 4, which shaft is driven by means of a drive device (not shown here), for example by an electric motor. In the embodiment shown here, a material path for the granular or grainy material extends in a vertical direction from the inlet opening 2 across the metering space 4 to the outlet opening 3, which is arranged below the metering wheel 5. The drive shaft 5 extends transversely to this in the horizontal direction.

The outlet opening 3 is designed as an opening with multiple paths, having a first outlet opening 3a and a second outlet opening 3b, which in the exemplary embodiment shown here are arranged in the lowest area of the metering space 4. While the first outlet opening 3a serves to discharge the metered material to the distributing device, the second outlet opening 3b can be used to execute an evacuation, which is shown schematically in FIG. 2. The second outlet opening 3b also can be used to catch a metered volume of the material, for example by means of an attached bag (not shown here), for example for calibration or test purposes.

Furthermore, an evacuation opening 7 is provided, via which the metering space 4 can be evacuated, as is an optional reservoir (tank) for the granular or grainy material located above the opening.

A slider device 8 is arranged above the metering space 4, which device is manually operable in the embodiment shown here to open or close the access to the metering space 4 via the inlet opening 2 by sliding a slider 9 in the horizontal direction.

Figure 2:
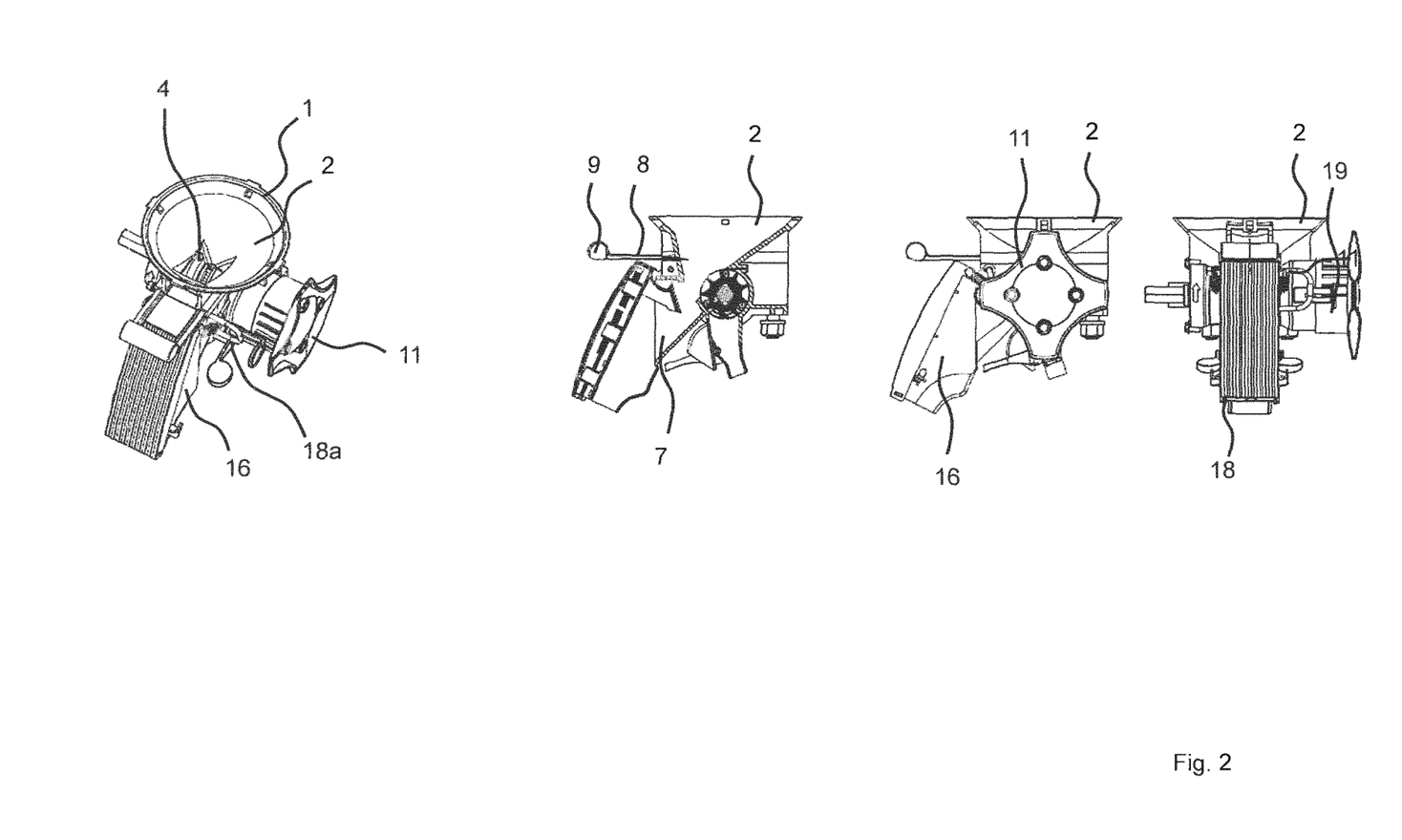
FIG. 2 schematic representations of the device from FIG. 1 in a state for evacuating.
Figure 3:
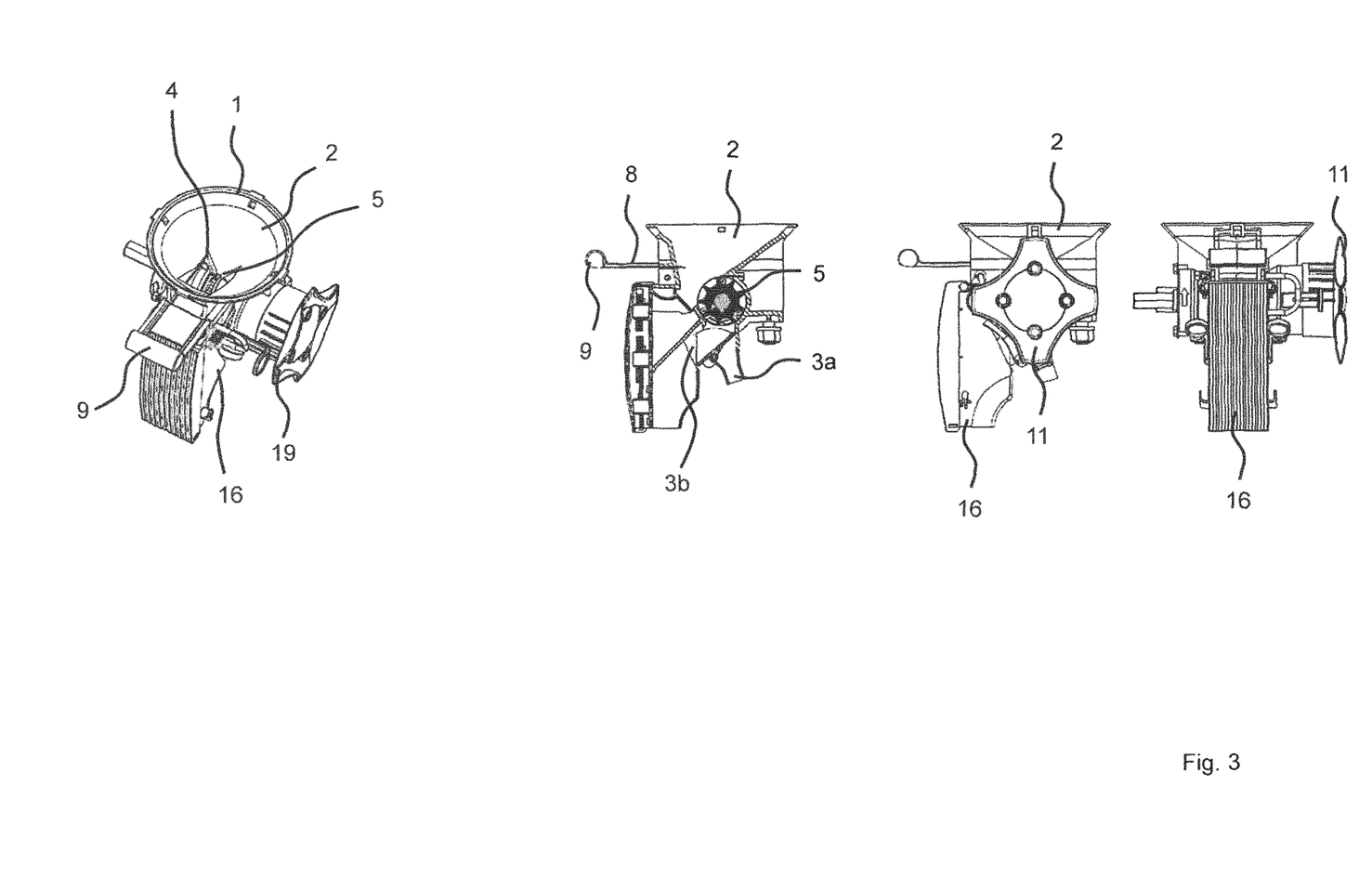
FIG. 3 schematic representations of the device for metering from FIG. 1 in a state for turning off or calibrating.
Figure 4:
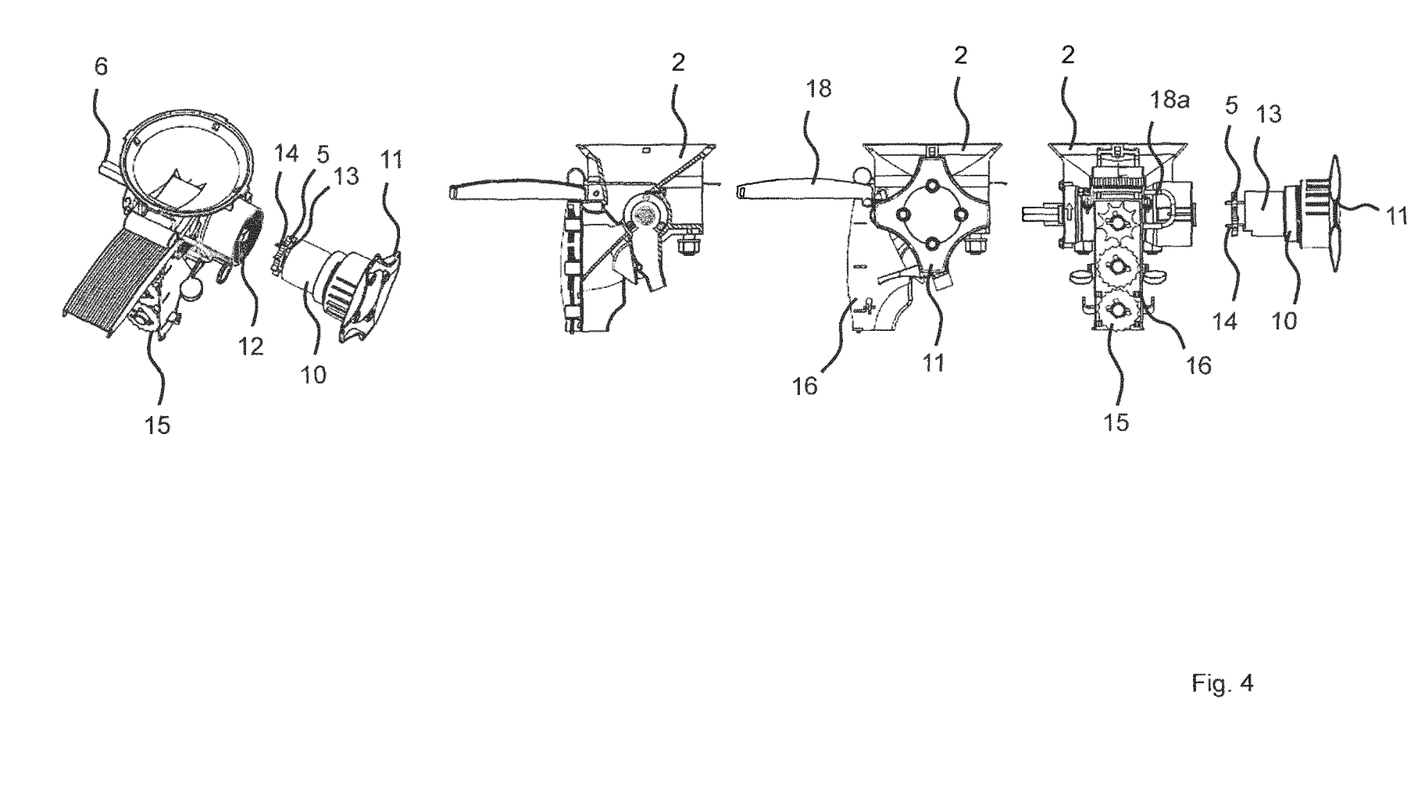
FIG. 4 schematic representations of the device from FIG. 1, wherein a mounting component with a metering wheel received on the same is detached for exchanging the metering wheel.

For assembly and disassembly, the metering wheel 5 is received detachably on a receiving unit 10 of a mounting component 11 (see FIG. 4). The mounting component 11 is arranged in a mounting opening 12 on the housing 1 in a mounted position, which is shown in FIGS. 1 to 3, in such a way that the metering wheel 5, when received on the receiving unit 10, is mounted on the drive shaft 6 when mounting the mounting component 11 in the mounted position. The metering wheel 5 is received on the receiving unit 10 on a rotatable support component 13 by means of protrusions 14 on its face, in particular received detachably, such that the metering wheel 5 turns along with the rotatable support component 13 during metering operations, while the mounting component 10 is arranged in the mounted position. In an alternative embodiment, the metering wheel 5 can be arranged on a non-rotatable support component, wherein the support permits the rotation of the metering wheel 5 during metering operations.

To exchange the metering wheel 5 in the embodiment shown here in FIG. 4, the mounting component 11 is detached from the mounted position and from the housing 1, whereby the metering wheel 5 is forcibly detached from the drive shaft 6. The mounting component 11 with the receiving unit 10 and the metering wheel 5 are jointly detached from the housing 1, such that the metering wheel 5 subsequently can optionally be removed from the receiving unit 10 and be exchanged. Subsequently, an interchangeable metering wheel 15 (see FIG. 4) can be detachably mounted on the mounting component 11, so that the interchangeable metering wheel 15 can then be mounted in the metering space 4. A changeover box 16 is provided, in which the plurality of interchangeable metering wheels 15 are detachably arranged. The various metering wheels in particular can differ with regards to their thickness or width.

The changeover box 16 is mounted on the housing 1 such that said box can be swiveled. A rear side 17 of the changeover box 16 serves as a deflecting surface for the material exiting from the evacuation opening 7 during an evacuation (see FIG. 2). In the embodiment shown here, the changeover box 16 is designed as a closed changeover box with a swiveling cover 18, with which the changeover box 16 can be opened and closed. The changeover box 16 is arranged below the slider 9 and can be locked in the various swivel positions by means of a locking device 18a, in particular in a closed and an open position (see FIGS. 1 and 4).

The mounting component 11 is screwed into the housing 1. Mounting marks 19 are arranged on the housing 1 and the mounting component 11, such that the operator can select defined rotational or screw positions for the mounting component 11, which allow a smooth rotatability for the metering wheel 5 when the mounting component 11 is arranged in the mounted position.

The housing 1 as well as the mounting component 11, the slider device 8 and the changeover box 16 can be manufactured from a plastic material. The metering wheel 5 can consist of metal or plastic.

Figure 5:
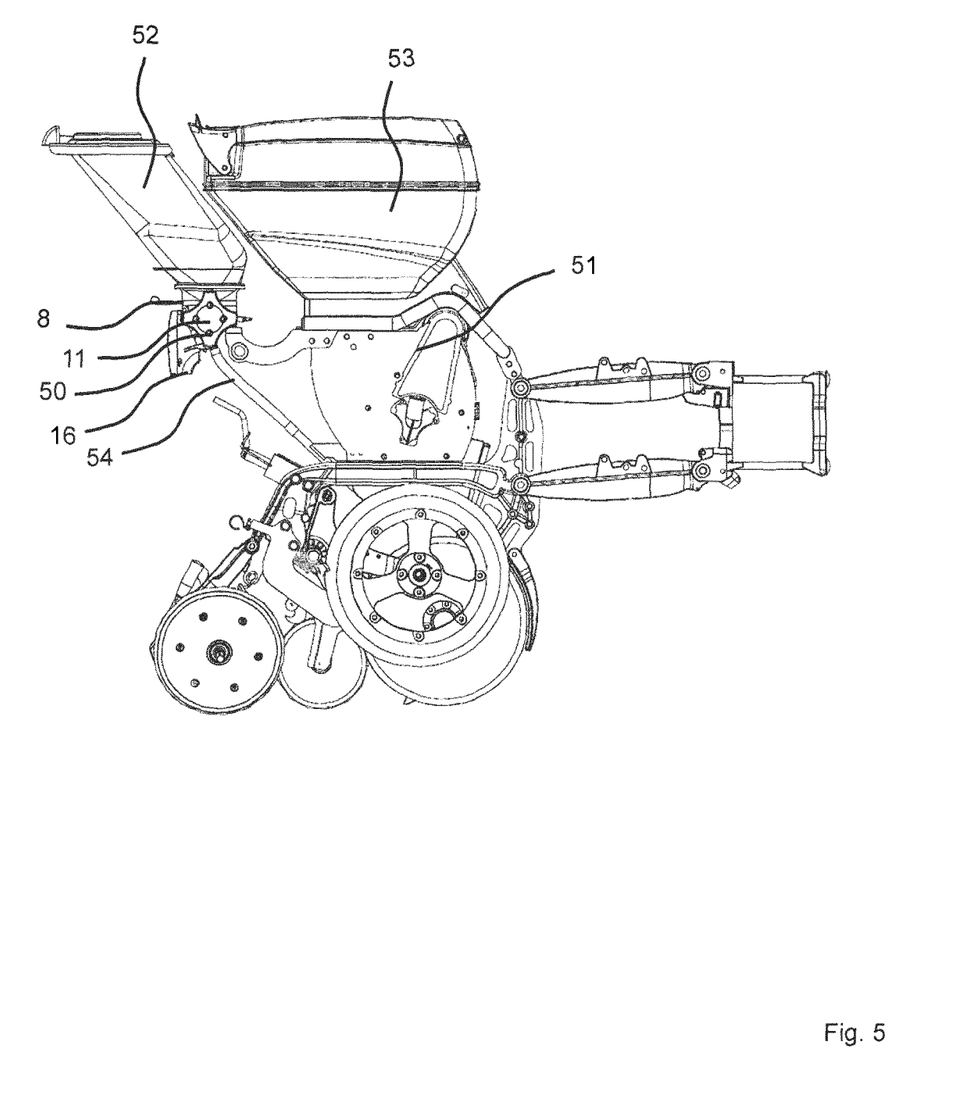
FIG. 5 a schematic representation of a sowing unit with a main metering device for the seeds and an auxiliary metering device.

FIG. 5 shows a schematic representation of a sowing unit, in which the device for metering shown in FIGS. 1 to 4 is provided as an auxiliary or supplementary metering device 50, with which the granular or grainy material, for example a fertiliser material, is metered as a supplement when discharging the seeds. The seeds themselves are metered and discharged by means of a main metering device 51. The auxiliary and main metering devices 50, 51 have a respective associated tank 52, 53. An outlet line 54 connects to the auxiliary metering device 50, via which line the metered material is transferred to the distributing device. FIG. 5 shows an example of a sowing unit, such as is already known in principle in various embodiments insofar as it relates to the main metering device 51.

The features disclosed in the description above, in the claims, and in the drawing can be significant to the realisation of the various embodiments both individually and in any combination.

The invention claimed is:

1. A device for metering a granular or grainy material in a distributor machine, said device comprising:
    a housing;
    an inlet opening formed on the housing, via which opening granular or grainy material can be introduced in the housing for metering;
    an outlet opening formed on the housing, via which opening the granular or grainy material can be discharged from the housing after metering;
    a metering space formed in the housing in such a manner that the granular or grainy material can pass in the housing from the inlet opening via the metering space to the outlet opening;

a metering wheel arranged on a drive shaft in the metering space and set up to meter the granular or grainy material supplied via the inlet opening;

a mounting opening formed on the housing, via which opening the metering wheel can be exchangeably mounted in the metering space; and a mounting component which is detachably arranged in the mounting opening in a mounted position on the housing such that said component at least partially covers said opening, wherein the mounting component has a receiving unit to detachably receive the metering wheel in such a manner that the metering wheel received in the receiving unit is mounted on the drive shaft when the mounting component is arranged in the mounted position and that the metering wheel is forcibly detached from the drive shaft when the mounting component is released from the mounted position, such that the metering wheel is thereby removable from the metering space and detachable from the housing together with the mounting component, wherein the metering wheel is arranged on a face of the mounting component by being received detachably on at least one protruding pin on the face of the receiving unit, the at least one protruding pin reaching through an opening of the metering wheel.

2. The device according to claim 1, wherein the metering wheel received in the receiving unit is mounted on the drive shaft in an operational position for metering when the mounting component is arranged in the mounted position.

3. The device according to claim 2, wherein the metering wheel received in the receiving unit is rotatable, at least when the mounting component is arranged in the mounted position.

4. The device according to claim 1, wherein the metering wheel received in the receiving unit is rotatable, at least when the mounting component is arranged in the mounted position.

5. The device according to claim 4, wherein the receiving unit has a rotatable support component on which the metering wheel is detachably received.

6. The device according to claim 1, wherein the mounting component is mountable in the mounting opening at the housing without need for tools.

7. The device according to claim 1, wherein the mounting component is screwed into an associated thread at the housing in the mounted position.

8. The device according to claim 1, wherein a slider device is provided, by means of which a material path for the granular or grainy material can be closed and opened between the inlet opening and the metering space.

9. The device according to claim 1, wherein the outlet opening is a multiple path opening with separate exits, which can be closed and opened individually and/or jointly by means of a closing device.

10. The device according to claim 1, wherein a deflecting device having a deflecting surface is arranged on the housing, which device is associated with the outlet opening and is set up to deflect material exiting from the outlet opening.

11. The device according to claim 1, wherein the inlet opening is coupled to a material reservoir for the granular or grainy material.

12. A distributor machine for distributing a granular or grainy material such as seeds, fertiliser, or grit, in particular a seed drill, fertiliser spreader, spreading machine or spreading tool, having a device for metering according to claim 1.

13. A device for metering a granular or grainy material in a distributor machine, the device comprising:

a housing;

an inlet opening formed on the housing, via which opening granular or grainy material can be introduced in the housing for metering;

an outlet opening formed on the housing, via which opening the granular or grainy material can be discharged from the housing after metering;

a metering space formed in the housing in such a manner that the granular or grainy material can pass in the housing from the inlet opening via the metering space to the outlet opening;

a metering wheel arranged on a drive shaft in the metering space and set up to meter the granular or grainy material supplied via the inlet opening;

a mounting opening formed on the housing, via which opening the metering wheel can be exchangeably mounted in the metering space; and a mounting component which is detachably arranged in the mounting opening in a mounted position on the housing such that said component at least partially covers said opening, wherein the mounting component has a receiving unit to detachably receive the metering wheel in such a manner that the metering wheel received in the receiving unit is mounted on the drive shaft when the mounting component is arranged in the mounted position and that the metering wheel is forcibly detached from the drive shaft when the mounting component is released from the mounted position, such that the metering wheel is thereby removable from the metering space and detachable from the housing together with the mounting component, wherein a changeover box is provided on the housing, which box is set up to receive a plurality of interchangeable metering wheels.

14. The device according to claim 13, wherein a deflecting surface is arranged on the changeover box.

* * * * *